United States Patent
Srinivas (10) Patent No.: US 11,537,740 B2
(45) Date of Patent: Dec. 27, 2022

(54) SYSTEM FOR ENHANCED DATA SECURITY USING VERSIONED ENCRYPTION

(71) Applicant: BANK OF AMERICA CORPORATION, Charlotte, NC (US)

(72) Inventor: Tatikonda Srinivas, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 133 days.

(21) Appl. No.: 17/140,711

(22) Filed: Jan. 4, 2021

(65) Prior Publication Data

US 2022/0215114 A1 Jul. 7, 2022

(51) Int. Cl.
| H04L 9/08 | (2006.01) |
| G06F 21/62 | (2013.01) |
| H04L 9/40 | (2022.01) |
| H04L 9/06 | (2006.01) |

(52) U.S. Cl.
CPC ........ *G06F 21/6227* (2013.01); *H04L 9/0643* (2013.01); *H04L 9/0861* (2013.01); *H04L 9/0894* (2013.01); *H04L 63/0442* (2013.01)

(58) Field of Classification Search
CPC ..... H04L 63/04; H04L 63/0428; H04L 63/06; H04L 63/062; H04L 63/0442; H04L 9/08; H04L 9/0819; H04L 9/0825; H04L 9/0861; H04L 9/0894; H04L 9/32; H04L 9/3236; H04L 9/3239; H04L 9/3242; G06F 21/62; G06F 21/6227; G06F 21/60
See application file for complete search history.

(56) References Cited

U.S. PATENT DOCUMENTS

| 4,868,877 A | 9/1989 | Fischer |
| 4,918,728 A | 4/1990 | Matyas et al. |
| 5,054,067 A | 10/1991 | Moroney et al. |
| 5,146,498 A | 9/1992 | Smith |
| 5,201,000 A | 4/1993 | Matyas et al. |
| 5,495,533 A | 2/1996 | Linehan et al. |
| 5,633,931 A | 5/1997 | Wright |
| 5,675,653 A | 10/1997 | Nelson, Jr. |
| 5,826,245 A | 10/1998 | Sandberg-Diment |
| 5,862,220 A | 1/1999 | Perlman |
| 5,870,477 A | 2/1999 | Sasaki et al. |
| 5,933,503 A | 8/1999 | Schell et al. |
| 6,012,144 A | 1/2000 | Pickett |
| 6,175,625 B1 | 1/2001 | Safford et al. |
| 6,185,679 B1 | 2/2001 | Coppersmith et al. |
| 6,199,162 B1 | 3/2001 | Luyster |

(Continued)

*Primary Examiner* — Shaqueal D Wade-Wright
(74) *Attorney, Agent, or Firm* — Moore & Van Allen PLLC; Anup Shrinivasan Iyer (57) ABSTRACT

Systems, computer program products, and methods are described herein for enhanced data security using versioned encryption. The present invention is configured to electronically receive, from a computing device of a user, a confidential data entry at a first server; encrypt the confidential data entry using a public key at the first server to generate an encrypted confidential data entry; transmit the encrypted confidential data entry to a second server, wherein the encrypted confidential data entry comprises a hash value, wherein the hash value indicates a numbered version of the public key used to encrypt the confidential data entry; and store the encrypted confidential data entry in a database associated with the second server.

18 Claims, 3 Drawing Sheets

```
                            200
                             ↓

ELECTRONICALLY RECEIVE, FROM A COMPUTING DEVICE OF A USER, A
         CONFIDENTIAL DATA ENTRY AT A FIRST SERVER
                            202
                             ↓
  ENCRYPT THE CONFIDENTIAL DATA ENTRY USING A PUBLIC KEY AT THE FIRST
     SERVER TO GENERATE AN ENCRYPTED CONFIDENTIAL DATA ENTRY
                            204
                             ↓
  TRANSMIT THE ENCRYPTED CONFIDENTIAL DATA ENTRY TO A SECOND SERVER,
    WHEREIN THE ENCRYPTED CONFIDENTIAL DATA ENTRY COMPRISES A HASH
   VALUE, WHEREIN THE HASH VALUE INDICATES A NUMBERED VERSION OF THE
      PUBLIC KEY USED TO ENCRYPT THE CONFIDENTIAL DATA ENTRY
                            206
                             ↓
      STORE THE ENCRYPTED CONFIDENTIAL DATA ENTRY IN A DATABASE
              ASSOCIATED WITH THE SECOND SERVER
                            208
```

(56) References Cited

U.S. PATENT DOCUMENTS

| | | |
|---|---|---|
| 6,240,187 B1 | 5/2001 | Lewis |
| 6,259,789 B1 | 7/2001 | Paone |
| 6,336,186 B1 | 1/2002 | Dyksterhouse et al. |
| 10,917,440 B1 * | 2/2021 | Reddy ................ H04L 63/0471 |
| 11,212,264 B1 * | 12/2021 | Griffin ..................... H04L 9/14 |
| 2001/0052071 A1 | 12/2001 | Kudo et al. |
| 2002/0029337 A1 | 3/2002 | Sudia et al. |
| 2018/0124023 A1 * | 5/2018 | Qi ........................... H04L 67/02 |
| 2019/0132299 A1 * | 5/2019 | Tucker ................ H04L 63/0853 |
| 2021/0099291 A1 * | 4/2021 | Baratte ................ H04L 9/0822 |
| 2021/0184843 A1 * | 6/2021 | Shpurov ............... H04L 9/3271 |
| 2022/0141012 A1 * | 5/2022 | Adams ................. H04L 9/3066 |
| | | 713/193 |

\* cited by examiner

SYSTEM FOR ENHANCED DATA SECURITY USING VERSIONED ENCRYPTION

FIELD OF THE INVENTION

The present invention embraces a system for enhanced data security using versioned encryption.

BACKGROUND

Encryption is often applied in two different forms, a symmetric key or an asymmetric key. A symmetric key, or secret key, uses one key to both encode and decode the information. Asymmetric, or public key cryptography on the other hand, uses two linked keys—one private and one public. The encryption key is public and can be used by anyone to encrypt. The opposite key is kept private and used to decrypt. This also means that a compromised private key may render the sensitive data vulnerable.

There is a need for a system for enhanced data security using versioned encryption.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for enhanced data security using versioned encryption is presented. The system comprising: at least one non-transitory storage device; and at least one processing device coupled to the at least one non-transitory storage device, wherein the at least one processing device is configured to: electronically receive, from a computing device of a user, a confidential data entry at a first server; encrypt the confidential data entry using a public key at the first server to generate an encrypted confidential data entry; transmit the encrypted confidential data entry to a second server, wherein the encrypted confidential data entry comprises a hash value, wherein the hash value indicates a numbered version of the public key used to encrypt the confidential data entry; and store the encrypted confidential data entry in a database associated with the second server.

In some embodiments, the at least one processing device is further configured to: generate, using a regeneration algorithm, the public key, a private key, and a regeneration key; store the public key in a first server; and store the private key in a second server.

In some embodiments, the at least one processing device is further configured to: encrypt the regeneration key using the private key to generate a private regeneration key; and store the private regeneration key in the first server.

In some embodiments, the at least one processing device is further configured to: encrypt the regeneration key using the public key to generate a public regeneration key; and store the public regeneration key in the second server.

In some embodiments, the at least one processing device is further configured to: generate one or more versions of the public key using the private regeneration key; and store the one or more versions of the public key in a keystore associated with the first server.

In some embodiments, the at least one of the one or more versions of the public key is used to encrypt the confidential data entry at the first server.

In some embodiments, the at least one processing device is further configured to: generate one or more versions of the private key using the public regeneration key; and store the one or more versions of the private key in a keystore associated with the second server.

In some embodiments, the at least one processing device is further configured to: electronically receive, from the computing device of the user, a request to access the confidential data entry; retrieve the encrypted confidential data entry from the database associated with the second server; and determine a numbered version of the private key corresponding to the numbered version of the public key used to encrypt the confidential data entry.

In some embodiments, the at least one processing device is further configured to: retrieve the numbered version of the private key from the keystore associated with the second server; decrypt the encrypted confidential data entry using the numbered version of the private key at the second sever; and transmit control signals configured to cause the computing device of the user to display the confidential data entry in response to decrypting the encrypted confidential data entry.

In another aspect, a computer program product for enhanced data security using versioned encryption is presented. The computer program product comprising a non-transitory computer-readable medium comprising code causing a first apparatus to: electronically receive, from a computing device of a user, a confidential data entry at a first server; encrypt the confidential data entry using a public key at the first server to generate an encrypted confidential data entry; transmit the encrypted confidential data entry to a second server, wherein the encrypted confidential data entry comprises a hash value, wherein the hash value indicates a numbered version of the public key used to encrypt the confidential data entry; and store the encrypted confidential data entry in a database associated with the second server.

In yet another aspect, a method for enhanced data security using versioned encryption is presented. The method comprising: electronically receiving, from a computing device of a user, a confidential data entry at a first server; encrypting the confidential data entry using a public key at the first server to generate an encrypted confidential data entry; transmitting the encrypted confidential data entry to a second server, wherein the encrypted confidential data entry comprises a hash value, wherein the hash value indicates a numbered version of the public key used to encrypt the confidential data entry; and storing the encrypted confidential data entry in a database associated with the second server.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

Data Encryption is used to deter unauthorized parties from accessing sensitive data. This is achieved by encoding the information that can only be accessed or decrypted by a user with the correct encryption key. An important line of defense in a cybersecurity architecture, encryption makes using intercepted data as difficult as possible. It can be applied to all kinds of data protection needs ranging from classified government intel to personal credit card transactions. Two main types of data encryption exist—asymmetric encryption, also known as public-key encryption, and symmetric encryption.

Encryption is often applied in two different forms, a symmetric key or an asymmetric key. A symmetric key, or secret key, uses one key to both encode and decode the information. Asymmetric, or public key cryptography on the other hand, uses two linked keys—one private and one public. The encryption key is public and can be used by anyone to encrypt. The opposite key is kept private and used to decrypt. This also means that a compromised private key may render the sensitive data vulnerable.

The present invention provides an improvement over existing encryption frameworks by introducing a regeneration key. This regeneration key will be used to create versioned public and private keys. Each versioned key will have a specific indicator (in the form of a hash value) in the encrypted confidential data entry. Any of these versioned public keys (generated using the regeneration key) may be used to encrypt the confidential data entry. By providing the specific indicator in the encrypted confidential data entry, the present invention allows for the decrypting server to choose the corresponding version of the private key (also generated using the regeneration key) to decrypt the encrypted confidential data entry. This enhances the security of the encryption framework as the same public/private key pair need not be used consistently for encrypting every confidential data entry. By using the versioned keys, the present invention also enables the encryption of each confidential data entry using a different versioned key. Should any one of the versioned private keys be compromised, the present invention enables the user to simply choose a different version that is independent of the versioned key that was compromised and continue operation as usual without any exposure.

Figure 1:
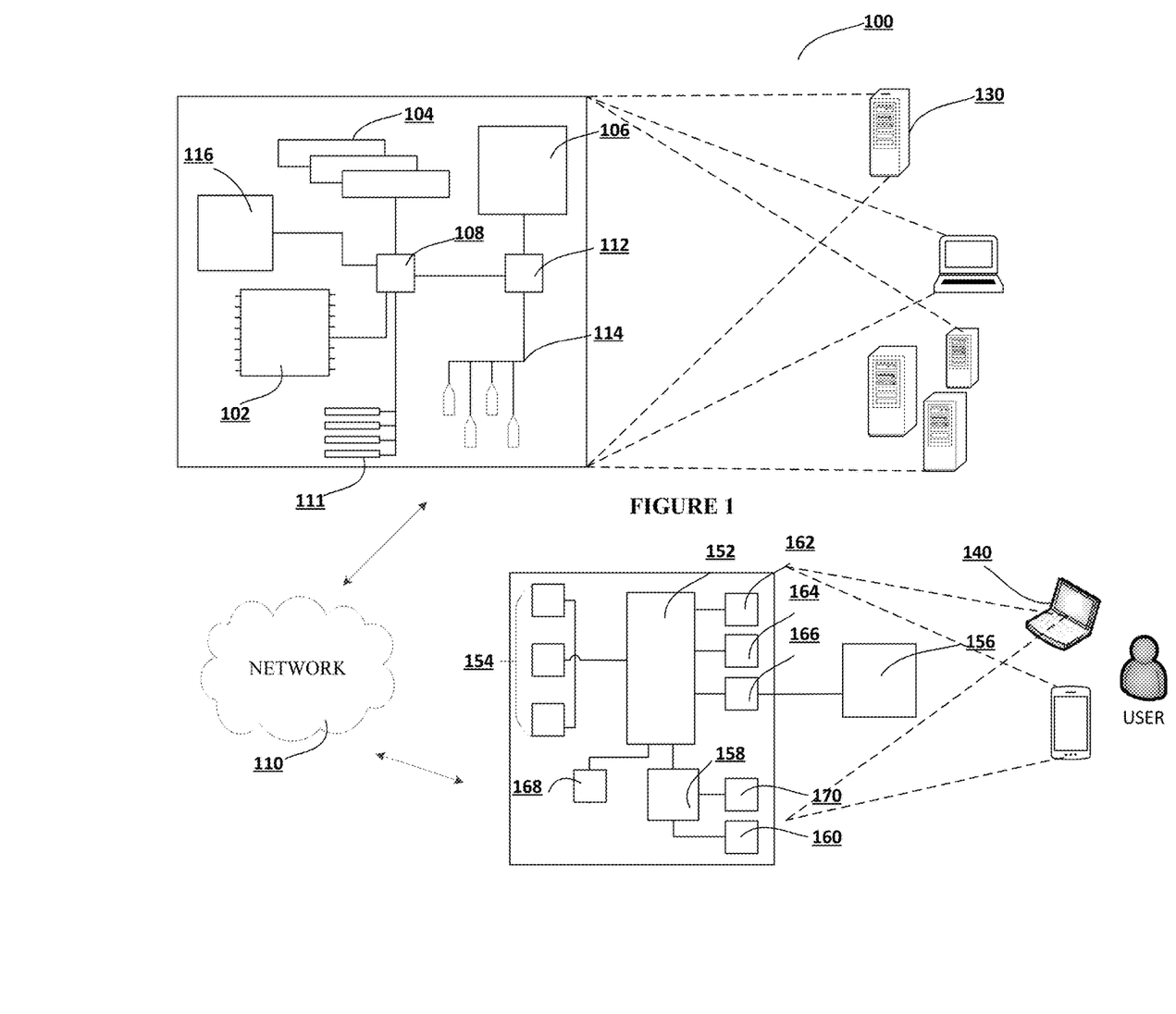
FIG. 1 illustrates technical components of a system for enhanced data security using versioned encryption, in accordance with an embodiment of the invention.

FIG. 1 presents an exemplary block diagram of the system environment for enhanced data security using versioned encryption 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices automated teller machine devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 140 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

Figure 2:
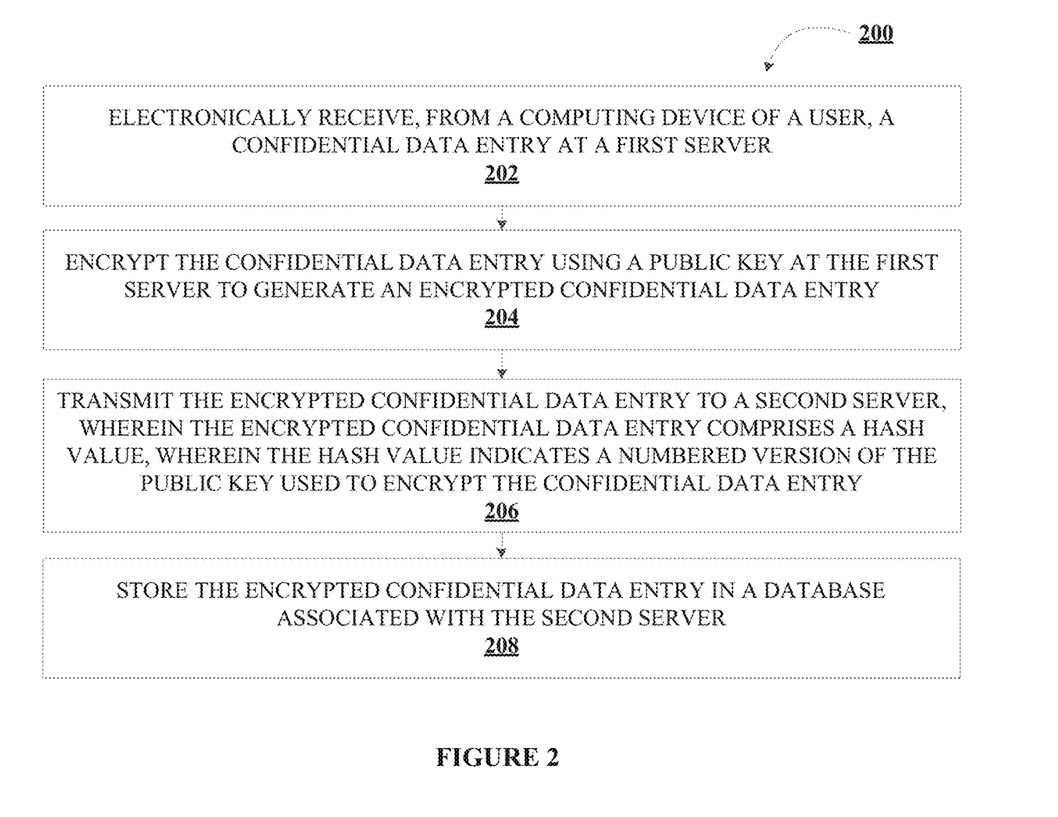
FIG. 2 illustrates a process flow for enhanced data security using versioned encryption, in accordance with an embodiment of the invention.

FIG. 2 illustrates a process flow for enhanced data security using versioned encryption 200, in accordance with an embodiment of the invention. As shown in block 202, the process flow includes electronically receiving, from a computing device (such as the user input system 140) of a user, a confidential data entry at a first server. As used herein, "confidential data entry" may include confidential, private and/or sensitive information or data. In some embodiments, the system may be configured to receive the confidential data entry from the user via one or more applications stored on the computing device of the user.

Next, as shown in block 204, the process flow includes encrypting the confidential data entry using a public key (specifically, a numbered version of the public key) at the first server to generate an encrypted confidential data entry. In some embodiments, the system may be configured to generate, using a regeneration algorithm, the public key, a private key, and a regeneration key at a second server. Once the private key is generated, it is stored in the second server. Once the public key is generated, it is stored in the first server. In some embodiments, the system may be configured to encrypt the regeneration key using the private key to generate a private regeneration key. Once the private regeneration key is generated, it is stored in the first server. Similarly, the system may be configured to encrypt the regeneration key using the public key to generate a public regeneration key. Once the public regeneration key is generated, it is stored in the second server.

In some embodiments, the system may be configured to generate one or more versions of the public key using the private regeneration key. Once the different versions of the public key are generated, they are system may be configured to store the one or more versions of the public key in a keystore associated with the first server. Similarly, the system may be configured to generate one or more versions of the private key using the public regeneration key. In response, the system may be configured to store the one or more versions of the private key in a keystore associated with the second server.

Next, as shown in block 206, the process flow includes transmitting the encrypted confidential data entry to a second server, wherein the encrypted confidential data entry comprises a hash value, wherein the hash value indicates a numbered version of the public key used to encrypt the confidential data entry. In some embodiments, at least one of the one or more versions of the public key is used to encrypt the confidential data entry at the first server. In response to encrypting the confidential data entry using at least one of the one or more versions of the public key, the system may be configured to initiate a hash algorithm to generate a numeric string output of fixed length (e.g., 2048 bits) to indicate the specific version of the public key used to encrypt the confidential data entry. Once the hash value is generated, it is appended to the encrypted confidential data entry and transmitted to the second server. Hash algorithms are typically designed to be collision-resistant, meaning that there is a very low probability that the same string would be created for different data. Any suitable hash algorithm may be used to generate the hash value, including, but not limited to, MD5 (Message-Digest algorithm 5), SHA-1 (Secure Hash Algorithm), and/or the like.

Next, as shown in block 208, the process flow includes storing the encrypted confidential data entry in a database associated with the second server. In some embodiments, once the encrypted confidential data entry at a second server, the system may be configured to store the encrypted confidential data entry in a database for future retrieval.

In some embodiments, the system may be configured to electronically receive, from the computing device of the user, a request to access the confidential data entry. In one aspect, to ensure that the user is eligible to request access to the confidential data entry, the system may be configured to transmit an authentication request to the user. In response, the user may be required to provide authentication credentials for validation to verify the identity of the user. Once the user's identity is verified, the system may be configured to retrieve the encrypted confidential data entry from the database associated with the second server. In some embodiments, the system may be configured to determine, from the hash value embedded in the encrypted confidential data entry, a numbered version of the private key corresponding to the numbered version of the public key used to encrypt the confidential data entry. For example, if public key version 2 (Pub_V2) was used to encrypt the confidential data entry, then the hash value embedded in the encrypted confidential data entry will include an indication that Pub_V2 was used for encryption. When decrypting the encrypted confidential data entry, the second server may then determine that the corresponding version of the private key is private key version 2 (Prv_V2).

In response, the system may be configured to retrieve the numbered version of the private key from the keystore associated with the second server. Once retrieved, the system may be configured to decrypt the encrypted confidential data entry using the numbered version of the private key at the second sever. Once decrypted, the confidential data entry is then transmitted to the first server. In response to transmitting the decrypted confidential data entry to the first server, the system may be configured to transmit control signals configured to cause the computing device of the user to display the confidential data entry.

Figure 3:
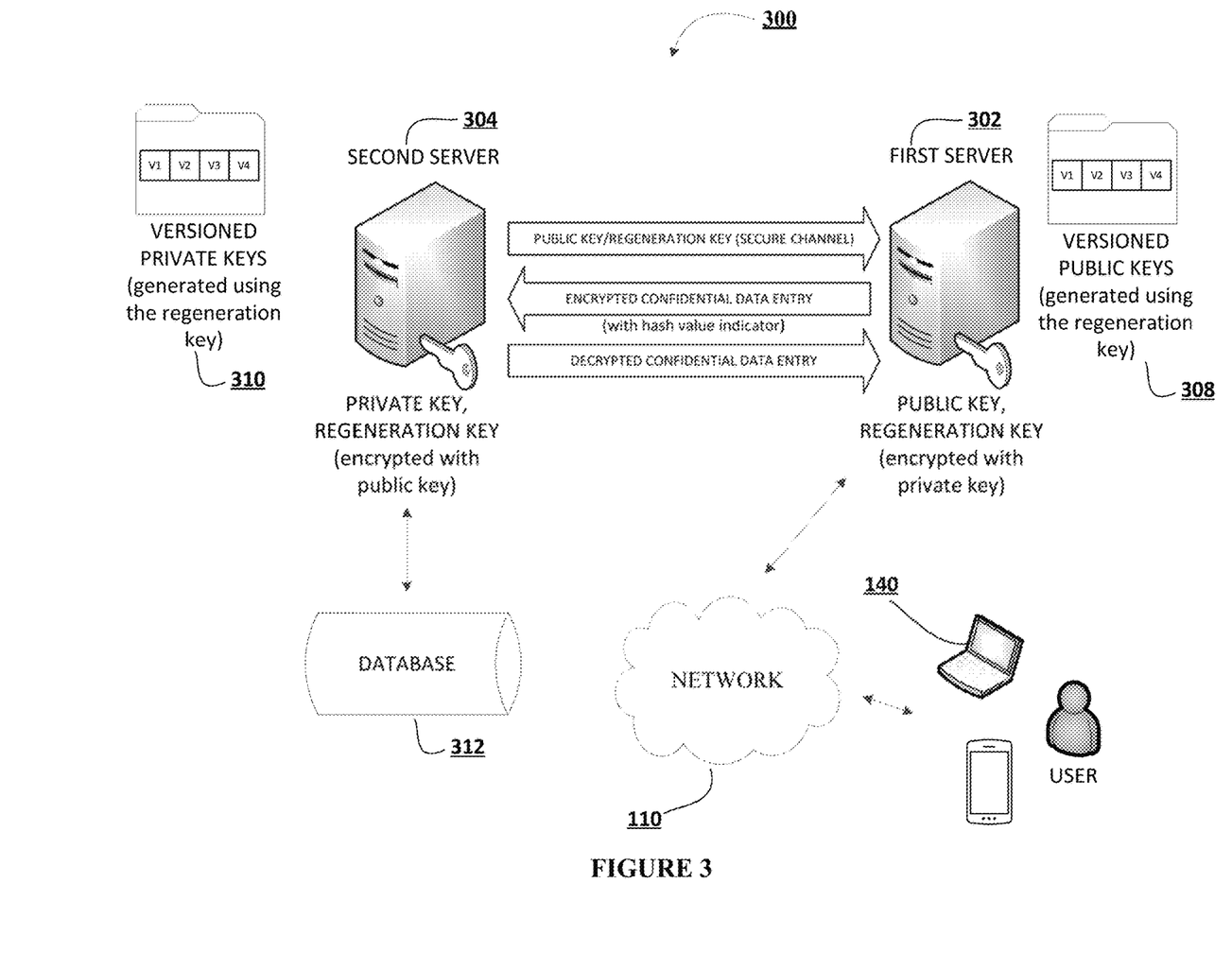
FIG. 3 illustrates a data flow diagram for enhanced data security using versioned encryption, in accordance with an embodiment of the invention.

FIG. 3 illustrates a data flow diagram for enhanced data security using versioned encryption 300, in accordance with an embodiment of the invention. As illustrated in FIG. 3, the data flow diagram includes a first server 302, a second server 304, and the user input system 140. Both the first server 302 and the second server 304 are part of the overall system 130 (shown in FIG. 1). As described herein, the system may be configured to initiate a regeneration algorithm to generate the public key, the private key, and the regeneration key at the second server. Bot the public key and the regeneration key are then transmitted to the first server via a secure channel. The regeneration key that is transmitted to the first server is encrypted using the private key, while the regeneration key that is stored in the second server with the private key is encrypted using the public key.

The regeneration key on the second server my be used to generate a number of versioned private keys that are stored in the keystore 310. Similarly, the regeneration key on the first server may be used to generate a number of versioned public keys that are stored in the keystore 308. When the user inputs a confidential data entry using the user input system 140, the system may be configured to receive the confidential data entry from the user input system 140 via the network 110. In response, the system may be configured to encrypt the confidential data entry using at least one of the one or more versioned public keys at the first server 302. In some cases, the portions of the confidential data entries may be encrypted using different versioned public keys. Once encrypted, the encrypted confidential data entry is then received at the second server 304 to be stored in the database 312. This transmission also includes a hash value appended to the encrypted confidential data entry indicating the specific version of the regeneration key used to encrypt the confidential data entry.

When the user wishes to access the confidential data entry at a later time, the encrypted confidential data entry is retrieved from the database 312 and decrypted. To decrypt the encrypted confidential data entry, the system may be configured to determine, using appended hash value, the corresponding version of the private key. In some embodiments, the system may be configured to determine, using the regeneration algorithm, the version of the public key used to encrypt the confidential data entry, and according identify a corresponding version of the private key. Once the right version of the private key is identified, it is retrieved from the keystore and used to decrypt the encrypted confidential data entry. Once the encrypted confidential data entry is decrypted at the second server 304, it is then pushed to the first server 302 to be displayed on the user input system 140, via the network 110.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for enhanced data security using versioned encryption, the system comprising:
   at least one non-transitory storage device; and at least one processing device coupled to the at least one non-transitory storage device, wherein the at least one processing device is configured to:
generate, using a regeneration algorithm, a public key, a private key, and a regeneration key;
encrypt the regeneration key using the private key to generate a private regeneration key;
store the private regeneration key in a first server;
electronically receive, from a computing device of a user, a confidential data entry at the first server;
encrypt the confidential data entry using a public key at the first server to generate an encrypted confidential data entry;
transmit the encrypted confidential data entry to a second server, wherein the encrypted confidential data entry comprises a hash value, wherein the hash value indicates a numbered version of the public key used to encrypt the confidential data entry; and
store the encrypted confidential data entry in a database associated with the second server.

2. The system of claim 1, wherein the at least one processing device is further configured to:
store the public key in the first server; and
store the private key in a second server.

3. The system of claim 2, wherein the at least one processing device is further configured to:
encrypt the regeneration key using the public key to generate a public regeneration key; and
store the public regeneration key in the second server.

4. The system of claim 3, wherein the at least one processing device is further configured to:
generate one or more versions of the public key using the private regeneration key; and
store the one or more versions of the public key in a keystore associated with the first server.

5. The system of claim 4, wherein the at least one of the one or more versions of the public key is used to encrypt the confidential data entry at the first server.

6. The system of claim 4, wherein the at least one processing device is further configured to:
generate one or more versions of the private key using the public regeneration key; and
store the one or more versions of the private key in a keystore associated with the second server.

7. The system of claim 6, wherein the at least one processing device is further configured to:
electronically receive, from the computing device of the user, a request to access the confidential data entry;
retrieve the encrypted confidential data entry from the database associated with the second server; and
determine a numbered version of the private key corresponding to the numbered version of the public key used to encrypt the confidential data entry.

8. The system of claim 7, wherein the at least one processing device is further configured to:
retrieve the numbered version of the private key from the keystore associated with the second server;
decrypt the encrypted confidential data entry using the numbered version of the private key at the second sever; and
transmit control signals configured to cause the computing device of the user to display the confidential data entry in response to decrypting the encrypted confidential data entry.

9. A computer program product for enhanced data security using versioned encryption, the computer program product comprising a non-transitory computer-readable medium comprising code causing a first apparatus to:
generate, using a regeneration algorithm, a public key, a private key, and a regeneration key;
encrypt the regeneration key using the private key to generate a private regeneration key;
store the private regeneration key in a first server;
electronically receive, from a computing device of a user, a confidential data entry at the first server;
encrypt the confidential data entry using a public key at the first server to generate an encrypted confidential data entry;
transmit the encrypted confidential data entry to a second server, wherein the encrypted confidential data entry comprises a hash value, wherein the hash value indicates a numbered version of the public key used to encrypt the confidential data entry; and
store the encrypted confidential data entry in a database associated with the second server.

10. The computer program product of claim 9, wherein the first apparatus is further configured to:
store the public key in the first server; and
store the private key in a second server.

11. The computer program product of claim 10, wherein the first apparatus is further configured to:
encrypt the regeneration key using the public key to generate a public regeneration key; and
store the public regeneration key in the second server.

12. The computer program product of claim 11, wherein the first apparatus is further configured to:
generate one or more versions of the public key using the private regeneration key; and store the one or more versions of the public key in a keystore associated with the first server.

13. The computer program product of claim 12, wherein the at least one of the one or more versions of the public key is used to encrypt the confidential data entry at the first server.

14. The computer program product of claim 12, wherein the first apparatus is further configured to:
generate one or more versions of the private key using the public regeneration key; and store the one or more versions of the private key in a keystore associated with the second server.

15. The computer program product of claim 14, wherein the first apparatus is further configured to:
electronically receive, from the computing device of the user, a request to access the confidential data entry;
retrieve the encrypted confidential data entry from the database associated with the second server; and
determine a numbered version of the private key corresponding to the numbered version of the public key used to encrypt the confidential data entry.

16. The computer program product of claim 15, wherein the first apparatus is further configured to:
retrieve the numbered version of the private key from the keystore associated with the second server;
decrypt the encrypted confidential data entry using the numbered version of the private key at the second sever; and
transmit control signals configured to cause the computing device of the user to display the confidential data entry in response to decrypting the encrypted confidential data entry.

17. A method for enhanced data security using versioned encryption, the method comprising:
generating, using a regeneration algorithm, a public key, a private key, and a regeneration key;

encrypting the regeneration key using the private key to generate a private regeneration key;

storing the private regeneration key in a first server;

electronically receiving, from a computing device of a user, a confidential data entry at the first server;

encrypting the confidential data entry using a public key at the first server to generate an encrypted confidential data entry;

transmitting the encrypted confidential data entry to a second server, wherein the encrypted confidential data entry comprises a hash value, wherein the hash value indicates a numbered version of the public key used to encrypt the confidential data entry; and storing the encrypted confidential data entry in a database associated with the second server.

18. The method of claim 17, wherein the method further comprises:

storing the public key in the first server; and storing the private key in a second server.

\* \* \* \* \*